(12) United States Patent
Liao

(10) Patent No.: US 10,529,308 B1
(45) Date of Patent: Jan. 7, 2020

(54) MUSICAL INSTRUMENT SUPPORT BAR CAPABLE OF ADJUSTING BENDING DIRECTION AND BENDING ANGLE FREELY

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 0 days.

(21) Appl. No.: 16/438,883

(22) Filed: Jun. 12, 2019

(51) Int. Cl.
  *G10D 13/00* (2006.01)
  *G10D 13/02* (2006.01)
  *F16C 11/06* (2006.01)
  *G10D 13/06* (2006.01)

(52) U.S. Cl.
  CPC .......... *G10D 13/026* (2013.01); *F16C 11/069* (2013.01); *G10D 13/06* (2013.01)

(58) Field of Classification Search
  CPC .............................. G10D 13/006; G10D 13/00
  See application file for complete search history.

(56) References Cited

U.S. PATENT DOCUMENTS

| 5,692,719 | A |   | 12/1997 | Shepherd |
| 5,973,248 | A | * | 10/1999 | Chen .................... G10D 13/026 248/441.1 |
| 7,718,878 | B2 |   | 5/2010 | May |
| 9,633,635 | B2 |   | 4/2017 | Liao |

\* cited by examiner

*Primary Examiner* — Kimberly R Lockett
(74) *Attorney, Agent, or Firm* — Muncy, Geissler, Olds & Lowe, P.C.

(57) ABSTRACT

The present invention relates to a musical instrument support bar disposed between a musical instrument bottom pole and a musical instrument vertical pole. The musical instrument support bar comprises a holder, a ball head bar and an extension bar, wherein the holder comprises a bottom pole clamp for clamping the musical instrument bottom pole, and a ball type clamp. Two ends of the ball head bar are respectively a ball head end clamped by the ball type clamp, and a columnar end. Two ends of the extension bar are respectively a first end engaging the columnar end and a second end engaging the musical instrument vertical pole. Accordingly, as the universal rotation ability is formed by the ball head end clamped by the ball type clamp, the musical instrument support bar is bent freely so that a bending direction and a bending angle thereof can meet the needs in use.

9 Claims, 6 Drawing Sheets

MUSICAL INSTRUMENT SUPPORT BAR CAPABLE OF ADJUSTING BENDING DIRECTION AND BENDING ANGLE FREELY

FIELD OF THE INVENTION

The present invention relates to a support structure for a musical instrument, and more particularly to a musical instrument support bar capable of adjusting a bending direction and a bending angle freely.

BACKGROUND OF THE INVENTION

In the course of playing, it is necessary to set up a plurality of musical instruments and musical scores for a player to use. Players will use musical instruments such as those disclosed in U.S. Pat. Nos. 7,718,878 B2, 9,633,635 B2, 5,692,719, etc., such as a single-leg stand, a holder, a music stand, etc., to fix a plurality of musical instruments, such as cymbals, drums, cowbells, etc., as well as musical scores required for playing, so that the cymbals, drums, cowbells and other musical instruments and musical scores are placed beside the player.

Further, different players have different playing habits and hobbies, so the placement of the musical instruments or musical scores in personally adapted positions is one of the most important functions of a stand. The conventional stand, such as the above mentioned U.S. Pat. No. 7,718,878 B2 is a one-legged structure including a rotating shaft that can adjust a rotating angle in a single direction and a telescopic bar that can adjust a height. Although the rotating shaft and the telescopic bar can provide an adjustment function and help the player adjust to a desired height and angle, this conventional structure can only adjust the height or adjust the rotating angle in a single direction, so the player cannot adjust the bending direction and the bending angle to a desired position freely.

SUMMARY OF THE INVENTION

To this issue, the main objective of the present invention is to disclose a musical instrument support bar that may help a player adjust a bending direction and a bending angle freely.

To fulfill said objective, the present invention relates to a musical instrument support bar capable of adjusting a bending direction and a bending angle freely, which is disposed between a musical instrument bottom pole and a musical instrument vertical pole and comprises a holder, a ball head bar and an extension bar, wherein the holder which is provided with a bottom pole clamp that clamps the musical instrument bottom pole, and a ball type clamp, wherein the bottom pole clamp and the ball type clamp are connected together, and the ball type clamp is located above the bottom pole clamp.

Two ends of the ball head bar are respectively a ball head end which is clamped by the ball type clamp, and a columnar end; the ball head end has a universal rotation ability with respect to the ball type clamp; two ends of the extension bar are respectively a first end that engages and fixes the columnar end and a second end that engages and fixes the musical instrument vertical pole.

Accordingly, according to the present invention, the ball head end is clamped by the ball type clamp, such that the ball head end has a universal rotation ability relative to the ball type clamp, that is, the ball head bar is able to rotate universally with respect to the holder. In addition, the musical instrument vertical pole engages and fixes the extension bar, the extension bar then engages and fixes the ball head bar, and the holder clamps the musical instrument bottom pole. Therefore, the musical instrument vertical pole can rotate universally with respect to the musical instrument bottom pole. Therefore, a player can adjust a bending direction and a bending angle of the musical instrument vertical pole freely, thereby meeting the needs in playing.

DETAILED DESCRIPTION OF THE PREFERRED EMBODIMENTS

Figure 1:
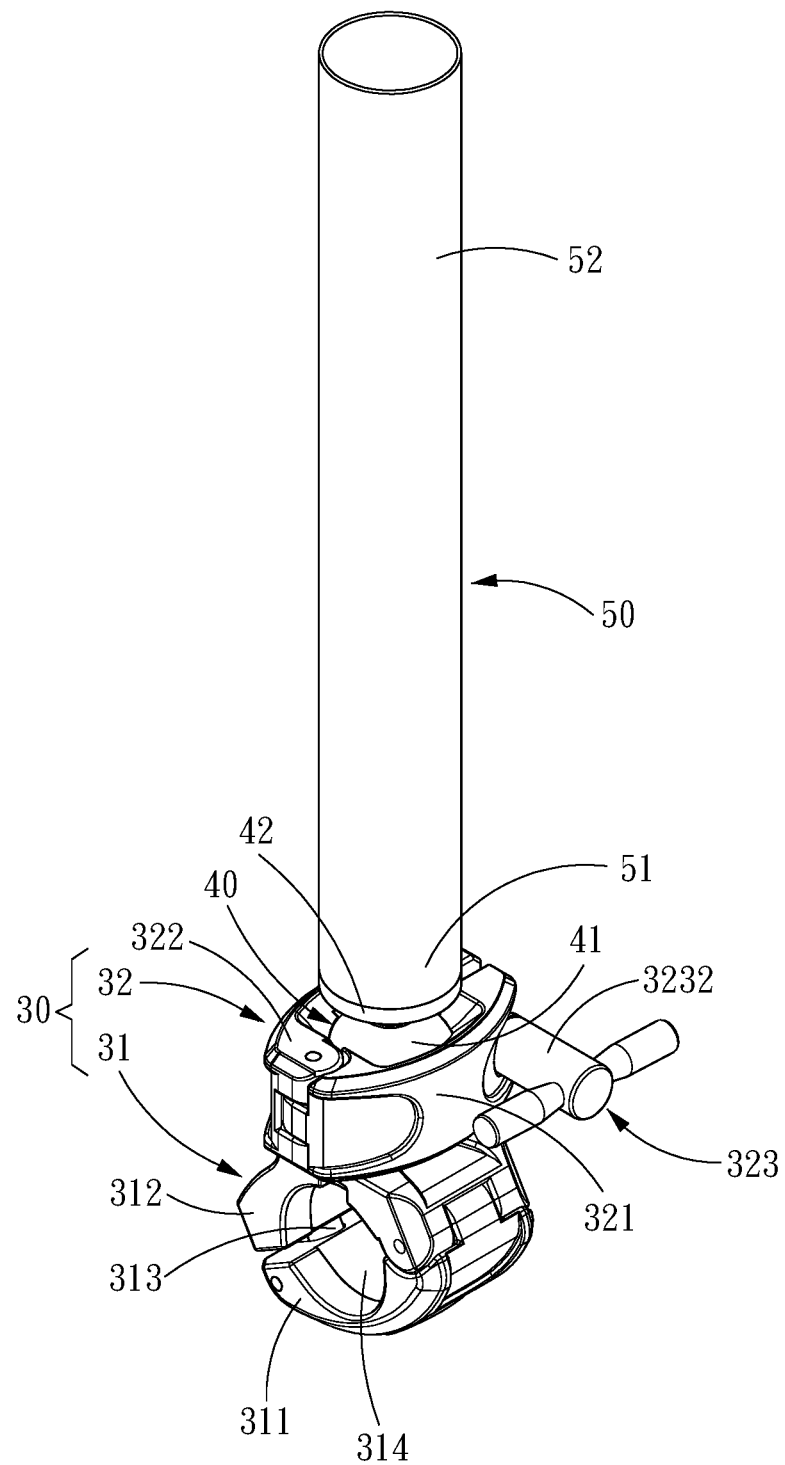
FIG. 1 is a structural diagram of a musical instrument support bar of the present invention.
Figure 2:
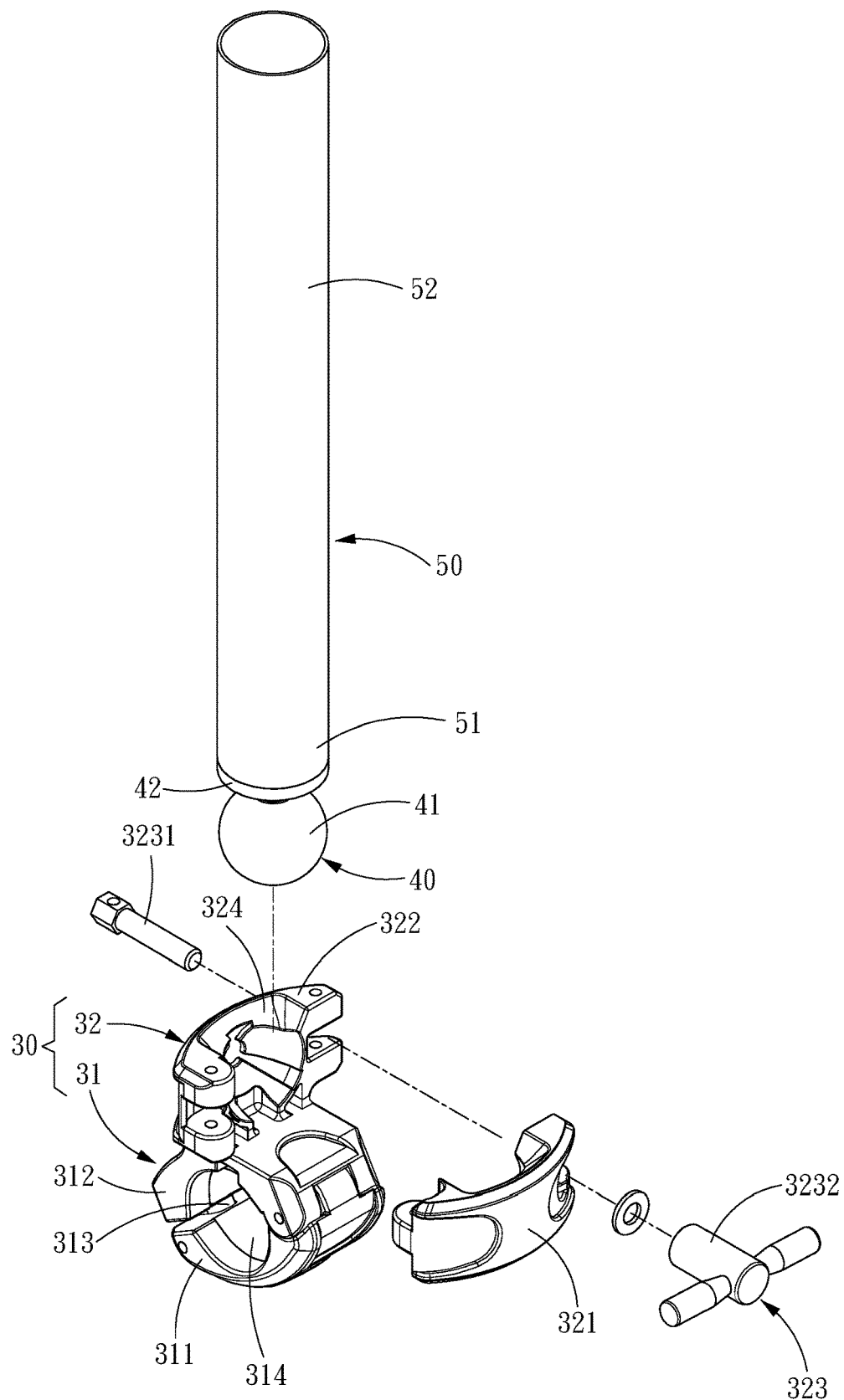
FIG. 2 is a structurally exploded view of the musical instrument support bar of the present invention.
Figure 3:
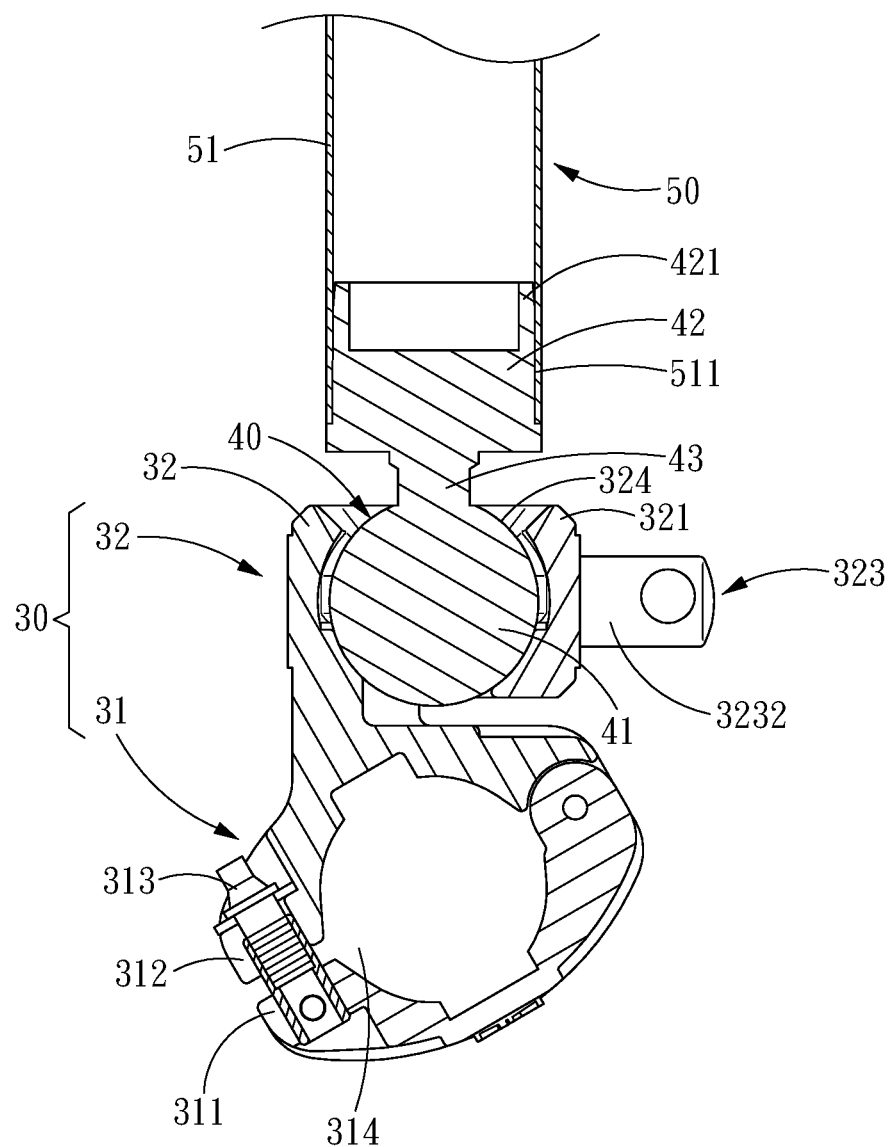
FIG. 3 is a structural section view of the musical instrument support bar of the present invention.

The technical content, features and efficacies of the present invention will be apparent from the detailed description of the preferred embodiments of the present invention by reference to the drawings.

As shown in FIGS. 1, 2, 3 and 5, the present invention relates to a musical instrument support bar capable of adjusting a bending direction and a bending angle freely, which is disposed between a musical instrument bottom pole 10 and a musical instrument vertical pole 20. The musical instrument bottom pole 10 is arranged horizontally. The musical instrument support bar comprises a holder 30, a ball head bar 40 and an extension bar 50, wherein the holder 30 comprises a bottom pole clamp 31 and a ball type clamp 32. A clamping direction of the bottom pole clamp 31 is perpendicular to a clamping direction of the ball type clamp 32. The bottom pole clamp 31 is used for clamping the musical instrument bottom pole 10 which is arranged horizontally. The bottom pole clamp 31 and the ball type clamp 32 are connected together, and the ball type clamp 32 is located above the bottom pole clamp 31.

The bottom pole clamp 31 comprises a first movable portion 311, a first fixed portion 312 and a first locking component 313, wherein the first movable portion 311 is rotatable relative to the first fixed portion 312, and a first clamping space 314 is formed between the first movable portion 311 and the first fixed portion 312. A profile of the first clamping space 314 corresponds to the musical instrument bottom pole 10. The first locking component 313 passes through and is clamped to the first fixed portion 312, and the first locking component 313 is screwed to the first movable portion 311. Therefore, the first movable portion 311 moves close to the first fixed portion 312 by rotating the first locking component 313, such that the bottom pole clamp 31 clamps the musical instrument bottom pole 10.

Figure 4:
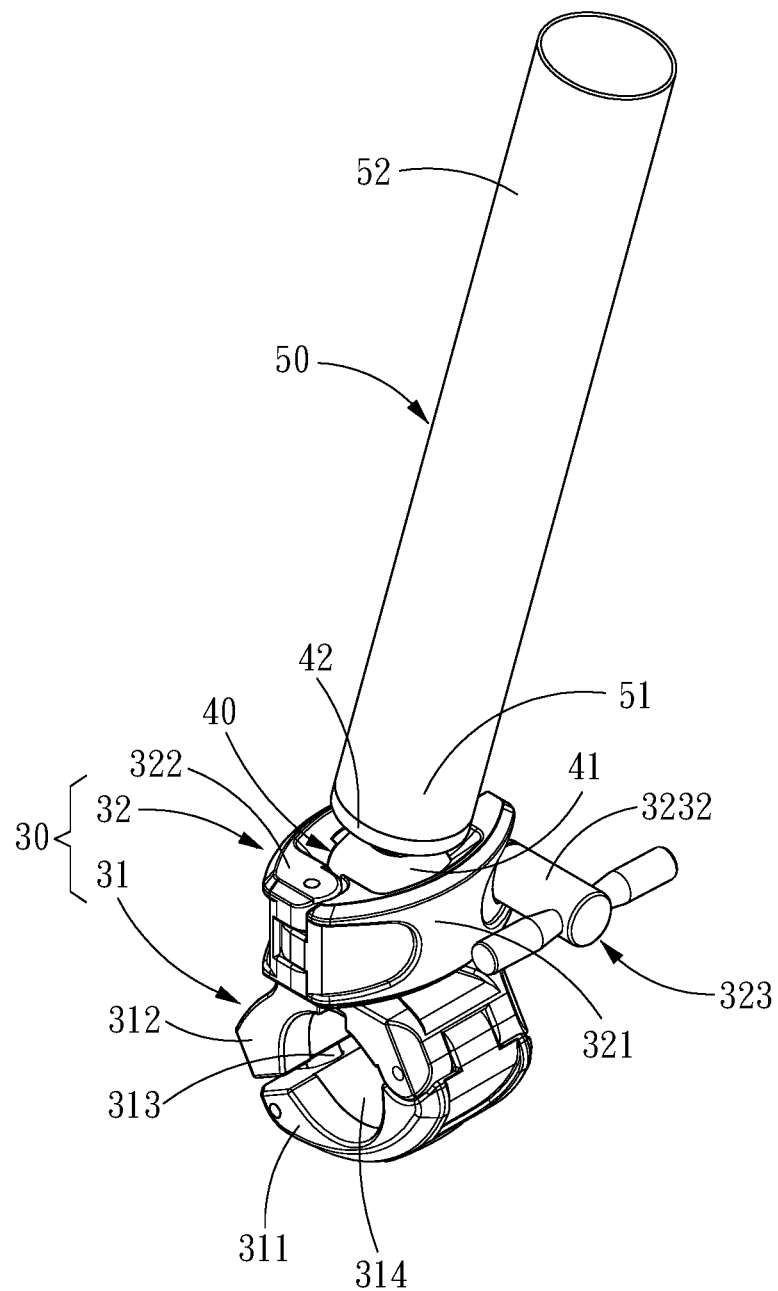
FIG. 4 is a structural diagram after the musical instrument support bar adjusts a bending direction and a bending angle.
Figure 5:
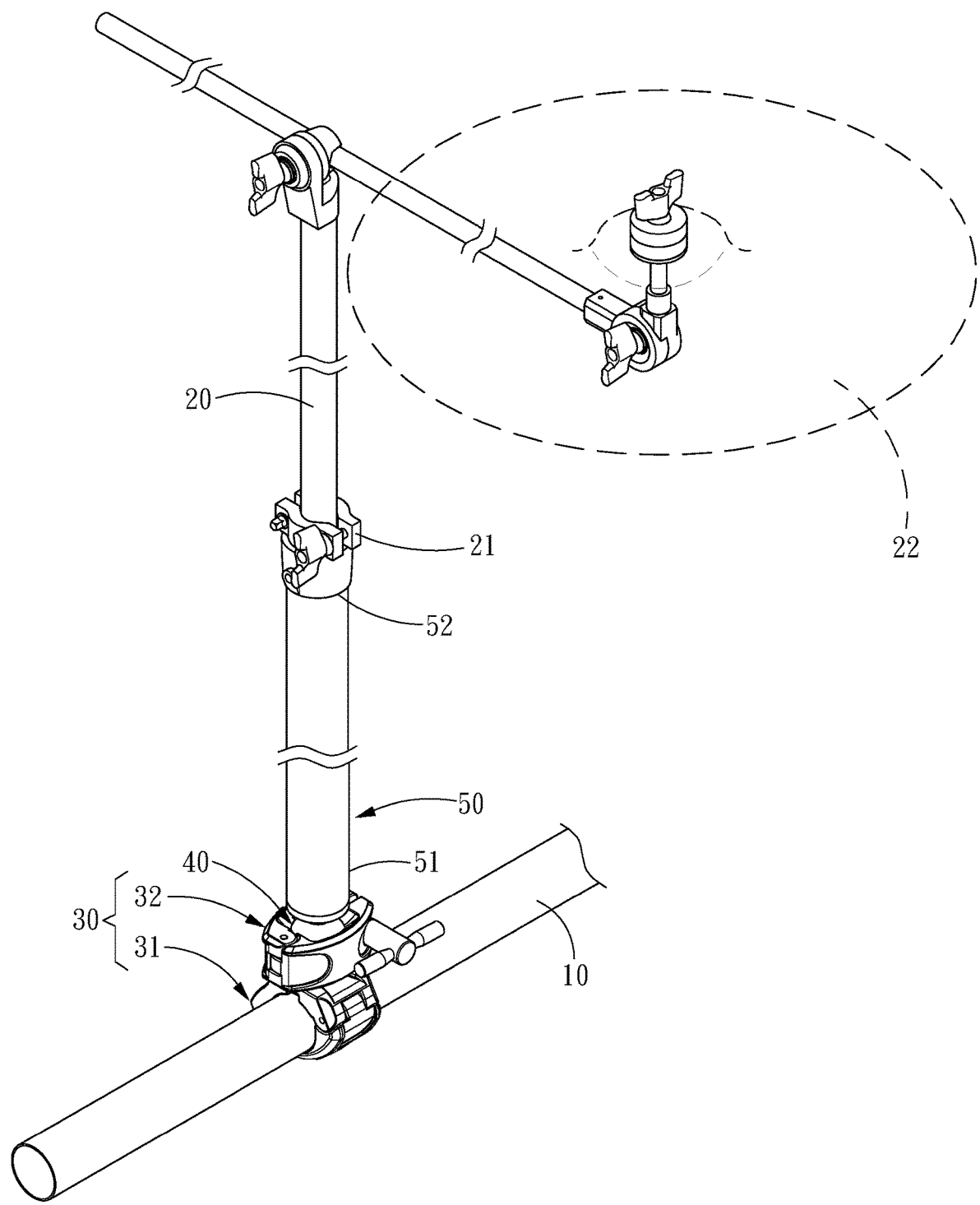
FIG. 5 is a schematic diagram in installation and use of the present invention.

Then referring to FIG. 4, two ends of the ball head bar 40 are respectively a ball head end 41 and a columnar end 42. The ball head end 41 is clamped by the ball type clamp 32. Since the ball head end 41 comprises a shape of a sphere, the ball head end 41 has an universal rotation ability with respect to the ball type clamp 32.

The ball type clamp 32 comprises a second movable portion 321, a second fixed portion 322 and a second locking component 323. The second movable portion 321 is rotatable with respect to the second fixed portion 322, and a second clamping space 324 is formed between the second movable portion 321 and the second fixed portion 322. A profile of the second clamping space 324 corresponds to the ball head end 41. The second locking component 323 comprises a threaded column 3231 and a lock 3232. The threaded column 3231 passes through the second fixed portion 322 and the second movable portion 321. The lock 3232 is screwed to the threaded column 3231 to drive the second movable portion 321 to move towards the second fixed portion 322. Therefore, when the lock 3232 is rotated, the ball type clamp 32 is able to clamp the ball head end 41.

The first fixed portion 312 and the second fixed portion 322 may be connected to each other and one-piece formed. In addition, the ball head bar 40 is provided with a neck segment 43 between the ball head end 41 and the columnar end 42. The neck segment 43 has a diameter less than that of the columnar end 42. Accordingly, when the ball head end 41 rotates universally with respect to the ball type clamp 32, it is able to prevent the columnar end 42 from interfering with the ball type clamp 32.

In addition, two ends of the extension bar 50 are respectively a first end 51 and a second end 52. The first end 51 engages and fixes the columnar end 42, and the second end 52 engages and fixes the musical instrument vertical pole 20. In addition, the first end 51 of the extension bar 50 has a hollow pipe structure 511. The columnar end 42 of the ball head bar 40 has an inner bar structure 421 which penetrates into and is fixed to the hollow pipe structure 511.

Referring to FIG. 5 again, the bottom pole clamp 31 clamps the musical instrument bottom pole 10, and the musical instrument vertical pole 20 clamps the second end 52 of the extension bar 50 by a vertical pole clamp 21. The musical instrument vertical pole 20 may be provided with a musical instrument 22. As shown in FIG. 4, a player is able to adjust a bending direction and a bending angle of the musical instrument vertical pole 20, thereby meeting the needs in playing.

Figure 6:
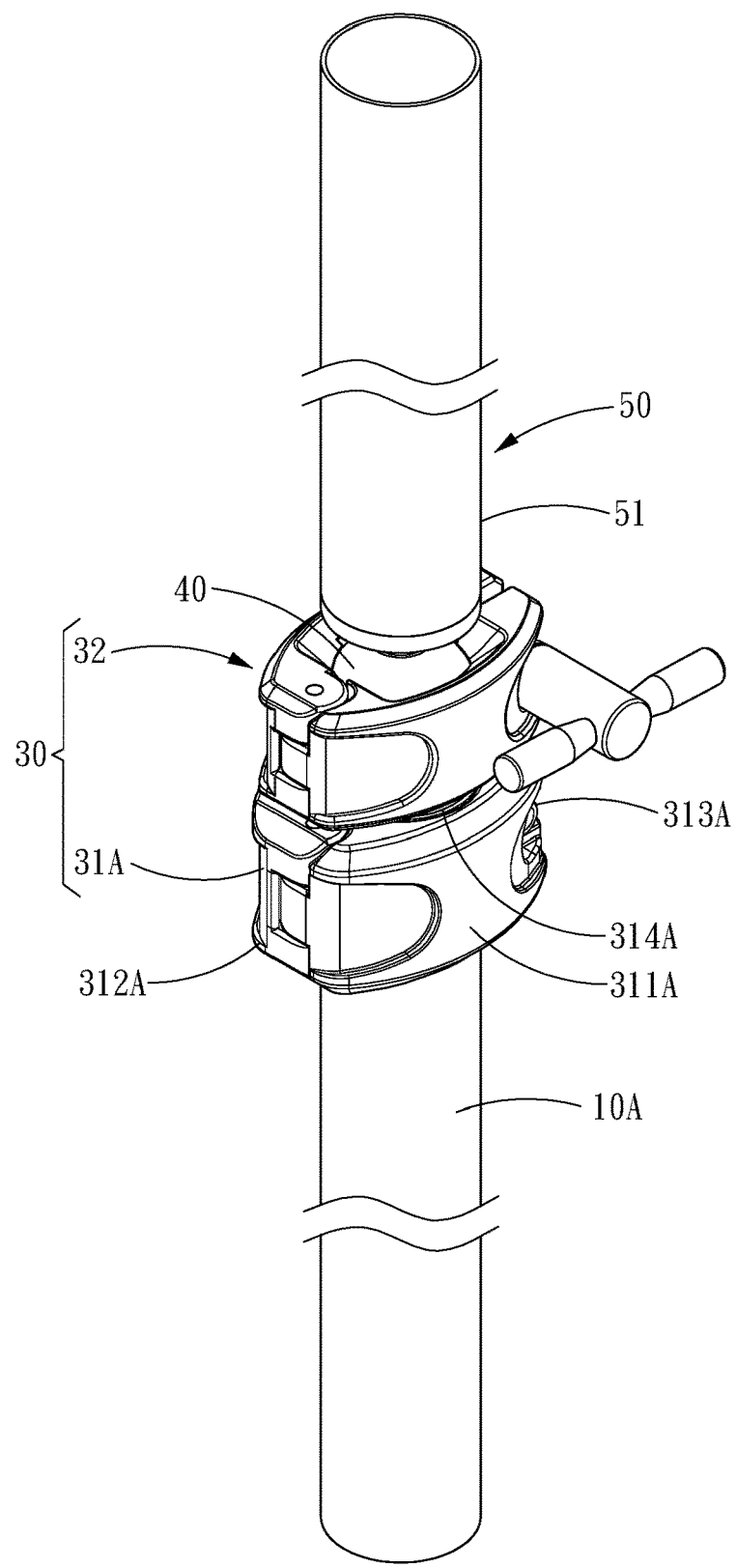
FIG. 6 is a schematic diagram in installation and use of another embodiment of the present invention.

FIG. 6 illustrates another embodiment of the present invention, wherein the musical instrument bottom pole 10A is arranged vertically. A clamping direction of the bottom pole clamp 31A is parallel to a clamping direction of the ball type clamp 32. In addition, the bottom pole clamp 31A correspondingly clamps the musical instrument bottom pole 10A which is arranged vertically. Similarly, the bottom pole clamp 31A and the ball type clamp 32 are connected together, and the ball type clamp 32 is located above the bottom pole clamp 31A. The bottom pole clamp 31A comprises a first movable portion 311A, a first fixed portion 312A and a first locking component 313A, wherein the first movable portion 311A is rotatable with respect to the first fixed portion 312A, and a first clamping space 314A is formed between the first movable portion 311A and the first fixed portion 312A. A profile of the first clamping space 314A corresponds to the musical instrument bottom pole 10A. The first locking component 313A passes through and is clamped to the first fixed portion 312A, and is screwed to the first movable portion 311A. Therefore, the first movable portion 311A moves close to the first fixed portion 312A by rotating the first locking component 313A, such that the bottom pole clamp 31A clamps the musical instrument bottom pole 10A tightly.

As stated above, the present invention has the following features, at least including:

1. the ball head bar can rotate universally with respect to the holder. In addition, the musical instrument vertical pole engages and fixes the extension bar, the extension bar then engages and fixes the ball head bar, and the holder clamps the musical instrument bottom pole. Therefore, the musical instrument vertical pole is able to rotate universally with respect to the musical instrument bottom pole. Therefore, a player can adjust a bending direction and a bending angle of the musical instrument vertical pole freely, thereby meeting the needs in playing.

2. The bottom pole clamp and the ball type clamp are connected together, which can prevent the bottom pole clamp from loosening from the ball type clamp.

3. The ball head bar is provided with a neck segment between the ball head end and the columnar end, such that the columnar end is prevented from interfering with the ball type clamp, and the universal rotation range of the ball head bar with respect to the holder is increased.

What is claimed is:

1. A musical instrument support bar capable of adjusting a bending direction and a bending angle freely, which is disposed between a musical instrument bottom pole and a musical instrument vertical pole, comprising:
    a holder comprising a bottom pole clamp that clamps the musical instrument bottom pole, and a ball type clamp, wherein the bottom pole clamp and the ball type clamp are connected together, and the ball type clamp is located above the bottom pole clamp;
    a ball head bar, wherein two ends of the ball head bar are respectively a ball head end which is clamped by the ball type clamp, and a columnar end; and
    an extension bar, wherein two ends of the extension bar are respectively a first end that engages and fixes the columnar end and a second end that engages and fixes the musical instrument vertical pole.

2. The musical instrument support bar capable of adjusting a bending direction and a bending angle freely according to claim 1, wherein the bottom pole clamp comprises a first movable portion, a first fixed portion and a first locking component; the first movable portion is rotatable relative to the first fixed portion, and a first clamping space is formed between the first movable portion and the first fixed portion; a profile of the first clamping space corresponds to the musical instrument bottom pole; the first locking component passes through and is clamped to the first fixed portion, and the first locking component is screwed to the first movable portion.

3. The musical instrument support bar capable of adjusting a bending direction and a bending angle freely according to claim 2, wherein the ball type clamp comprises a second movable portion, a second fixed portion and a second locking component; the second movable portion is rotatable relative to the second fixed portion, and a second clamping space is formed between the second movable portion and the second fixed portion; a profile of the second clamping space corresponds to the ball head end; the second locking component comprises a threaded column that passes through the second fixed portion and the second movable portion, and a lock that is screwed to the threaded column to drive the second movable portion to move towards the second fixed portion.

4. The musical instrument support bar capable of adjusting a bending direction and a bending angle freely according to claim 3, wherein the first fixed portion and the second fixed portion are connected to each other and are one-piece formed.

5. The musical instrument support bar capable of adjusting a bending direction and a bending angle freely according to claim 1, wherein the ball type clamp comprises a second movable portion, a second fixed portion and a second locking component; the second movable portion is rotatable relative to the second fixed portion, and a second clamping space is formed between the second movable portion and the second fixed portion; a profile of the second clamping space corresponds to the ball head end; the second locking component comprises a threaded column that passes through the second fixed portion and the second movable portion, and a lock that is screwed to the threaded column to drive the second movable portion to move towards the second fixed portion.

6. The musical instrument support bar capable of adjusting a bending direction and a bending angle freely according to claim 1, wherein the ball head bar further comprises a neck segment between the ball head end and the columnar end, and the neck segment has a diameter less than that of the columnar end.

7. The musical instrument support bar capable of adjusting a bending direction and a bending angle freely according to claim 1, wherein the first end of the extension bar has a hollow pipe structure; the columnar end of the ball head bar has an inner bar structure which penetrates into and is fixed to the hollow pipe structure.

8. The musical instrument support bar capable of adjusting a bending direction and a bending angle freely according to claim 1, wherein a clamping direction of the bottom pole clamp is perpendicular to a clamping direction of the ball type clamp.

9. The musical instrument support bar capable of adjusting a bending direction and a bending angle freely according to claim 1, wherein a clamping direction of the bottom pole clamp is parallel to a clamping direction of the ball type clamp.

* * * * *